Dec. 6, 1960     A. L. RENKEY     2,963,377
INSULATING REFRACTORY
Filed July 18, 1958
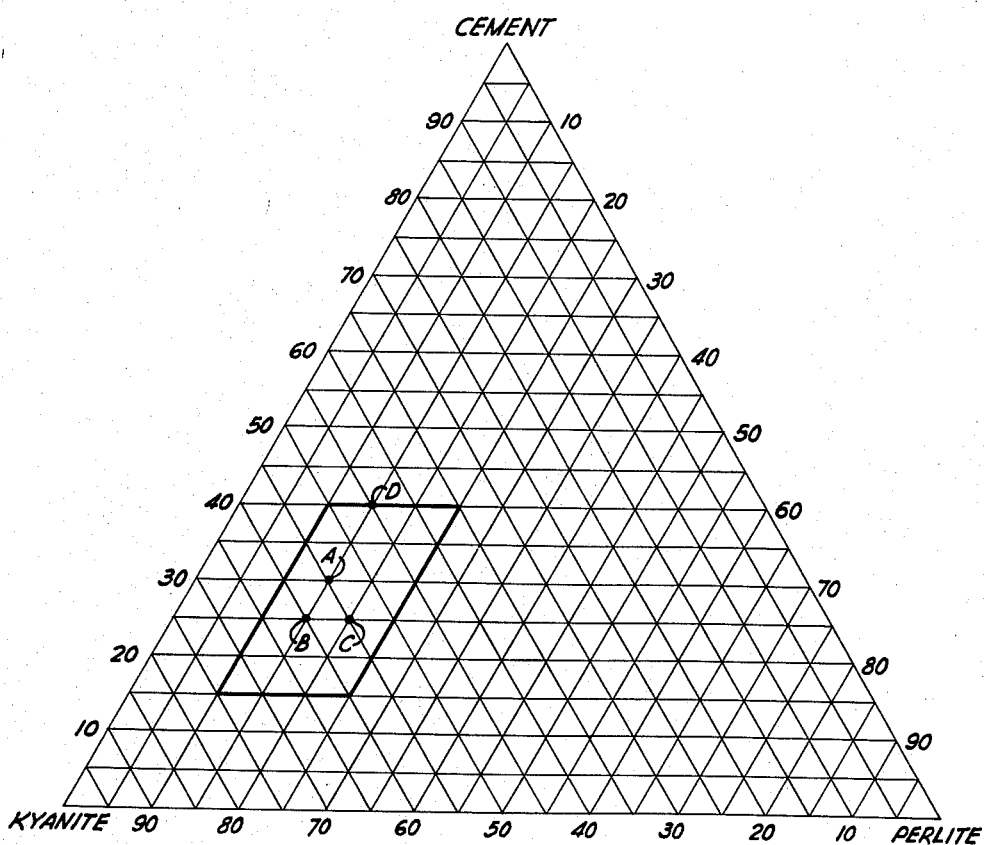
INVENTOR.
ALBERT L. RENKEY
BY
Brown, Critchlow, Flick & Peckham
ATTORNEYS

2,963,377

INSULATING REFRACTORY

Albert L. Renkey, Pittsburgh, Pa., assignor to Harbison-Walker Refractories Company, Pittsburgh, Pa., a corporation of Pennsylvania Filed July 18, 1958, Ser. No. 749,519

4 Claims. (Cl. 106—64)

This invention relates to lightweight, insulating, castable refractories which are usable at high temperatures.

To achieve maximum strength and refractoriness in making castable or other refractory products, it is conventional to seek as high a density in the resulting product as possible. This desideratum generally is achieved through use of a high percentage of very dense refractory grains such, for example, as calcined bauxite and the like. This end is also achieved by grading the particles entering the composition in a fashion to result in but a minimum volume of pores. Such low porosity, high density mixes have a low shrinkage when mixed and therefore may be used at high temperatures. Castables capable of use at 3000° F. for extended periods are not uncommon.

When low thermal conductivity in a refractory product is desired, high density is sacrificed, generally by introducing density reducing agents. This, however, results in such an increase in shrinkage in the product when subjected to elevated temperature that the operating temperature at which such products may be used is materially lowered, since the temperature must be kept sufficiently low that shrinkage beyond tolerable limits does not occur. This situation is illustrated in the ASTM classification of castable refractories, C401–57T. In that classification it will be noted that high density castables are divided into six classes of which the most refractory is class F. Materials in this class withstand temperatures on the order of 3100° F. with no more than 1.5% linear shrinkage. On the other hand, none of the insulating castables is required to withstand temperatures above 2300° F. This is indicative of the general loss in refractoriness which accompanies the production of materials of lower density. It may also be noted from this table that to achieve the increase in apparent usables temperatures of insulating castables from 1700° F. to 2300° F., it was necessary to permit bulk density to increase by about 80%, or from 55 to 95 lbs. per cubic foot.

There are commercially available many insulating compositions. Typically these contain granules of materials such as calcined diatomaceous earth, expanded vermiculite, porous clay aggregates, such as Haydite, and also bauxite, alumina, mullite, silica and so on. Unfortunately, some of these materials possess a low melting point and consequently cannot withstand high temperatures. It is believed that such factors account for the absence, prior to the present invention, of commercially available lightweight, insulating refractory castables capable of withstanding temperatures on the order of 2500° F. and higher and which have a density not exceeding about 65 pounds per cubic foot.

It is a major object of this invention to provide a castable insulating refractory that is of low density and yet can withstand high temperatures.

It is a further object of the invention to provide insulating refractory compositions in accordance with the foregoing objects that can be easily prepared from commercially available, inexpensive raw materials.

I have discovered that the objects of this invention can be attained by providing an insulating refractory from a composition containing expanded perlite, crude kyanite and calcium aluminate cement in which those constituents are present in a defined relationship hereinafter described. The products produced from these compositions provide an insulating refractory possessing unique characteristics. As a consequence of this discovery, lightweight, insulating castable refractories are provided that can withstand temperature as high as 2600° F. and even up to 2700° F., have a low density below about 65 lbs. per cubic foot (p.c.f.), have low linear shrinkage below about 1.5 percent even after being subjected to high temperatures, and are further characterized in that they have good strength and abrasion resistance.

In accordance with this invention, insulating refractory castable compositions are prepared with the following constituents:

| | Weight percent |
|---|---|
| Calcium aluminate cement | 15–40 |
| Crude kyanite | 40–75 |
| Expanded perlite | 10–25 |

The range of compositions is shown graphically on the attached drawing. To attain the objects of the invention not only must the composition limits, based on the solids content as set forth in the above table, be observed, but the purity of the solids used is also of significance. Crude (uncalcined) kyanite forms the largest component of the mix in forming insulating refractories in accordance with this invention. The kyanites that are useful must conform to the following composition:

$Fe_2O_3+TiO_2$—not more than 2.5%
$SiO_2$—not more than 48%
$Al_2O_3$ balance but at least 50%

The kyanite should be ground so that substantially all of it will pass a Tyler screen at least as fine as 20 mesh with at least 30% passing a 100 mesh Tyler screen. Preferably, I use material passing a 100 mesh Tyler screen.

Expanded perlite is the lightweight material used in compositions in accordance with my invention. Expanded perlite is a lightweight, easily crushed, globular particle which is basically aluminum silicate. While expanded perlite melts at temperatures below 2000° F., compositions of my invention are not adversely affected as a consequence thereof. It is believed that the perlite is retained within the resulting insulation by combining with or being absorbed into the more refractory components of the batch, i.e. the kyanite and the calcium aluminate cement. Expanded perlite for use in this invention should have a silica content of at least 65% and an alumina content of at least 10% and the balance being the usual constituents present in perlites. Although the size of the particles of perlite as used in this invention is not of critical significance, I have found it desirable to use material substantially all of which passes a 6 mesh Tyler screen and not more than 10 percent of which passes a 100 mesh Tyler screen.

The binder that is used in my invention is calcium aluminate cement. This cement is an article of commerce and generally contains a $CaO–Al_2O_3$ ratio of at least 1:1, though cements with a lower or higher proportion of lime can be used if desired. The cement must be relatively pure and must not be contaminated with more than 3% of $Fe_2O_3$ or similar component that may result in mineral inversions. The cement conventionally is used in a size all of which passes a 100 mesh Tyler screen.

In preparing insulation from my compositions, it is necessary to add water to a substantially homogeneous mixture of the solid components. The quantity of water added depends largely on the method that the material is to be applied. For example, a trowelling consistency is produced with less water than is required to produce a mix suitable for pouring or casting. Where moist ramming or similar casting technique is used, still smaller quantities of water are necessary than in producing a trowelling consistency. Generally about 20 to 65 weight percent of water, based on the solids, is used. In commercial practice the mix usually is shipped dry and water is added at the point of application. Where shapes are cast, they are air cured at room temperature for about 24 hours to permit the cement to obtain hydraulic set, after which they are dried at about 200° to 300° F. for 1 to 24 hours.

In illustrating the invention, insulating castable compositions were prepared from expanded perlite, crude kyanite and a calcium aluminate cement in amounts within the specified ranges. The analysis of each of the materials used was as follows:

| Kyanite | Perlite | Cement |
| --- | --- | --- |
| 55% $Al_2O_3$<br>42.5% $SiO_2$<br>1% $Fe_2O_3$<br>1% $TiO_2$<br>0.5% Ignition Loss | 70% $SiO_2$<br>15% $Al_2O_3$<br>2% $Fe_2O_3$<br>1% MgO<br>1% CaO<br>7% Alkalies<br>4% Ignition loss | 72% $Al_2O_3$<br>27% CaO<br>1% $Fe_2O_3$+$SiO_2$+MgO |

The average particle size of the perlite was such that it all passed a 6 mesh Tyler screen. The crude kyanite was ground to an average particle size of about 100 mesh while the cement was practically all minus 325 mesh. These components were intimately admixed in a laboratory mixer. Water was then added to the batch and test pieces were formed for testing purposes. The specimens were air cured and then dried at 230° F., and the density, the modulus of rupture, and the cold crushing strength of each brick were measured. The pieces were then heated to 2000° F. and held at temperature five hours. Thereafter they were permitted to cool to room temperature and the data were again taken. Other specimens were heated to 2550° F. and maintained for an additional five hours. Upon cooling, the foregoing data were measured a third time. In addition to these data, linear change after the reheat at 2000° F. and again after the 2550° F. reheat were obtained and are set forth in the following table:

Table I

|  | A | B | C | D |
| --- | --- | --- | --- | --- |
| Brick Mix (weight percent): |  |  |  |  |
| Calcium Aluminate Cement | 30 | 25 | 25 | 40 |
| Perlite | 15 | 15 | 20 | 15 |
| Crude Kyanite | 55 | 60 | 55 | 45 |
| Water (weight percent of solids) | 50 | 52 | 66.5 | 50 |
| Weight, p.c.f.: |  |  |  |  |
| after drying 230° F | 62 | 55 | 46 | 60 |
| after 2,000° F. reheat |  | 50 | 43 | 52 |
| after 2,550° F. reheat | 55 | 48 | 45 | 50 |
| Modulus of Rupture, p.s.i.: |  |  |  |  |
| after drying 230° C | 240 | 110 | 80 | 220 |
| after 2,000° F. reheat |  | 50 | 30 | 100 |
| after 2,550° F. reheat | 230 | 240 | 260 | 160 |
| Linear change: |  |  |  |  |
| Reheat 2,000° F percent |  | −0.3 | −1.0 | −0.5 |
| Reheat 2,550° F do | +0.1 | +0.8 | −1.5 | +1.4 |
| Cold crushing strength: |  |  |  |  |
| after drying 230° F | 640 | 340 | 210 | 780 |
| after 2,550° F. reheat | 860 | 500 | 480 | 470 |

Considering the above data, it is apparent that the insulating refractory compositions of this invention are of outstanding utility. These brick are capable of withstanding temperatures well beyond 2500° F. yet they are of low density, ranging from 46 to 62 lbs. per cubic foot at their highest level. As is known, a cold crushing strength of at least about 200 lbs. per square inch is necessary to permit conventional handling after the material is dried. As shown above, the insulation bodies have a crushing strength of at least 200 p.s.i. and several markedly exceed this minimum level. The linear stability of the products also is evident in the data above, and those data show that products of my invention can be used without danger of buckling or similar faults occurring as a consequence of undue dimensional change.

It was noted in preparing the test specimens for the foregoing series of tests that each mix had good workability, being easily trowelled and cast, thereby showing that the materials can be handled with the skills and experience now available in the art. The compositions also had excellent setting characteristics and set satisfactorily overnight.

From the foregoing it is evident that I have provided insulating refractories with a remarkable combination of properties. These refractories are particularly outstanding in that they may be used at operating temperatures several hundred degrees higher than heretofore possible for a comparable density. Indeed, in tests of these products, soaking temperatures well beyond 2700° F. were required to destroy the insulation by melting. Consequently, the overall thickness of a furnace wall can be reduced by the use of my insulation as a back-up layer.

Normally, there is a steep temperature gradient between the hot inner face and the outer face of a furnace wall. The outer face must be cool enough to permit workmen to approach the furnace to perform their tasks. As was noted above, compositions capable of withstanding temperatures of around 3000° F. and higher must be of high density and, therefore, have poor insulating properties. In using my insulating mixes, it is necessary to use only such a thickness of the highly refractory layer as is necessary to lower the temperature to 2700° F., instead of the usual 2300° F., which is the maximum temperature at which insulating compositions known prior to this invention can be used. Thus it can be seen that considerably less of the dense and expensive material is required in a furnace lining.

The compositions disclosed contain expanded perlite, crude kyanite and calcium aluminate cement in the percentages established above. Where it is desired for any reason, small quantities of each of the foregoing constituents may be replaced by other materials when density, crushing strength, refractoriness, or the like may be sacrificed to the extent that would result thereby. It should also be understood that although the invention has been exemplified as it applies to the formation of insulating shapes, the invention is not to be restricted thereby, but can be applied as by casting, pouring, tamping, gunning, trowelling or similar conventional application techniques that are now known in the art.

Unless otherwise stated, all percentages in this specification are on a weight basis.

According to the provisions of the patent statutes, I have explained the principle of my invention and have described what I now consider to represent its best embodiment. However, I desire to have it understood, that within the scope of the appended claims, the invention may be practiced otherwise than as specifically described.

I claim:

1. A lightweight insulating refractory that consists essentially of a tempered and dried mixture containing, on a solids basis, 10 to 25 weight percent of expanded perlite, 40 to 75 weight percent of crude kyanite and 15 to 40 weight percent of a calcium aluminate cement said perlite sized so that all of it will pass a 6-mesh Tyler screen and not more than 10 percent of it will pass a 100-mesh Tyler screen, said crude kyanite being sized so that all of it will pass a 20-mesh Tyler screen and at least 30 percent of it will pass a 100-mesh Tyler screen, and said cement being sized to pass a 100-mesh Tyler screen.

2. A refractory having a density not exceeding 65 pounds per cubic foot, capable of use at temperatures on the order of 2600° F., being substantially stable in linear dimension at elevated temperature and consisting essentially of a tempered and dried mixture containing, on a solids basis, 10 to 25 weight percent of expanded perlite, 40 to 75 weight percent of crude kyanite and 15 to 40 weight percent of a calcium aluminate cement said perlite being sized so that all of it will pass a 6-mesh Tyler screen and not more than 10 percent of it will pass a 100-mesh Tyler screen, said crude kyanite being sized so that all of it will pass a 20-mesh Tyler screen and at least 30 percent of it will pass a 100-mesh Tyler screen, and said cement being sized to pass a 100-mesh Tyler screen.

3. A refractory batch composition, for use in forming insulating refractories, that consists essentially of a mixture of 10 to 25 weight percent of expanded perlite, 40 to 75 weight percent of crude kyanite and 15 to 40 weight percent of a calcium aluminate cement said perlite being sized so that all of it will pass a 6-mesh Tyler screen and not more than 10 percent of it will pass a 100-mesh Tyler screen, said crude kyanite being sized so that all of it will pass a 20-mesh Tyler screen and at least 30 percent of it will pass a 100-mesh Tyler screen, and said cement being sized to pass a 100-mesh Tyler screen.

4. A refractory batch composition, for use in forming insulating refractories, that consists essentially of a mixture of 15 weight percent of expanded perlite, 60 weight percent of crude kyanite and 25 weight percent of a calcium aluminate cement said expanded perlite being sized so that all of it will pass a 6-mesh Tyler screen and not more than about 10 percent of it will pass a 100-mesh Tyler screen, said kyanite and cement being of a size to pass a 100-mesh Tyler screen.

References Cited in the file of this patent
UNITED STATES PATENTS

| | | |
|---|---|---|
| 2,407,135 | Clark | Sept. 3, 1946 |
| 2,793,128 | Emhiser | May 21, 1957 |
| 2,911,311 | Feagin et al. | Nov. 3, 1959 |
| 2,912,341 | Ricker | Nov. 10, 1959 |